United States Patent

[11] 3,577,173

[72] Inventor  Jack P. Blomgren
               Maplewood, Minn.
[21] Appl. No. 790,415
[22] Filed     Jan. 10, 1969
[45] Patented  May 4, 1971
[73] Assignee  Minnesota Mining and Manufacturing Company
               St. Paul, Minn.

[54] LAMP FAILURE DETECTION AND CHANGE DEVICE
     5 Claims, 3 Drawing Figs.
[52] U.S. Cl. .................................... 315/88,
     240/37.1, 315/151, 352/198
[51] Int. Cl. ................................. F21v 19/04,
     H05h 37/04
[50] Field of Search .......................... 315/86, 87,
     88, 89, 90, 93, 149, 159; 240/37, 37.1; 352/198;
     353/85, 87

[56]           References Cited
               UNITED STATES PATENTS
     1,830,537  11/1931  Frappier et al. ............ 240/37.1
     1,842,963   1/1932  Day ........................ 240/37.1
     2,892,966   6/1959  Smyth ...................... 315/89
     3,146,375   8/1964  Campbell ................... 315/89

Primary Examiner—Roy Lake
Assistant Examiner—E. R. LaRoche
Attorney—Kinney, Alexander, Sell, Steldt & Delahunt ABSTRACT: A projector which has a device for automatically replacing an expired main lamp with a spare lamp. The main lamp and the spare lamp are socketed in a lamp-changing mechanism which is operated in response to the operation of a lamp failure detector. The detector radiantly senses the failure of the main lamp and automatically activates the lamp-changing mechanism which will remove the main lamp from the focus position, advance the spare lamp into the focus position, and energize the spare lamp.

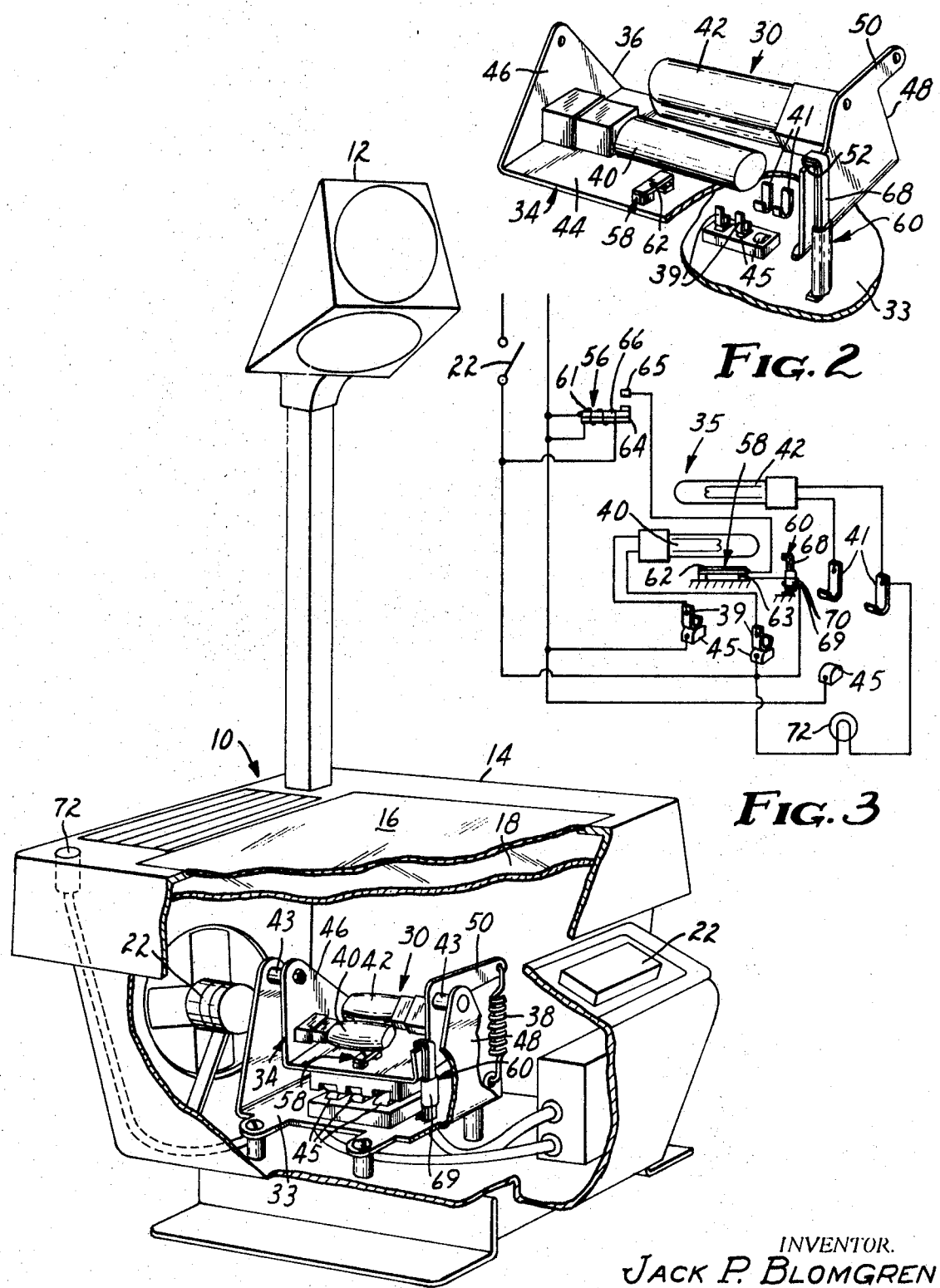

3,577,173

LAMP FAILURE DETECTION AND CHANGE DEVICE

BACKGROUND OF THE INVENTION

Educators, instructors and lecturers of all types have adopted the use of light-projecting devices such as slide projectors, movie projectors, and overhead projectors to dramatically and effectively present their subject matter to an audience. While it is desirable to be able to interrupt the picture series for the purpose of discussion and explanation or to point out certain objects in the picture on the screen, it is obviously undesirable to experience an unplanned exasperating interruption of the visually aided lecture by having the projector's lamp burn out.

SUMMARY OF THE INVENTION

The present invention relates to a projector having a device for detecting the failure of the main lamp and automatically replacing the properly positioned expired main lamp with the spare lamp, and in one aspect to a lamp failure detector having energy-sensing means and release means for activating the movement of the lamp-changing mechanism for moving the main lamp out of the focus position, moving the spare lamp into the focus position, and supplying energy to the spare lamp for continuation of the presentation with the minimum of interruption.

This device, therefore, detects the failure of the main lamp within a light-projecting device such as a slide projector, movie projector or overhead projector and automatically replaces the expired main lamp with a spare lamp for continuation of the program with a minimum of interruption.

Other uses and many of the attendant advantages of this invention will be readily understood and appreciated as the same becomes better understood by reference to the following detailed description when considered in connection with the accompanying drawing in which like numerals designate like parts throughout the FIGS. and detailed description and wherein;

FIG. 1 is a perspective view, partly in section, of an overhead projector utilizing the teachings of the present invention;

FIG. 2 is a perspective view, partly in section, of a portion of the lamp changing mechanism; and FIG. 3 is a wiring diagram, partially in pictorial form, of the lamp failure detector.

In the drawing and description of the embodiment of the invention illustrated in FIG. 1, the end of the projector shown at the right will be referred to as the "front" of the projector and the opposite end will be referred to as the "back." The portion of the machine which is in the uppermost in FIG. 1 comprises the "upper" portion of the machine and the opposite portion therefrom is called the "bottom" of the machine. The main lamp 40, as shown in FIGS. 1 and 2, is located in the "focus position" which is the proper focal length from the condensing lens of the Fresnel type and along the "optical centerline" of the projector.

Referring now to the embodiment shown in FIG. 1 there is shown an overhead projector generally designated 10 illustrative of the teachings of the invention, comprising a projection head 12 vertically supported by the lower boxlike case or base structure 14. The base structure 14 further comprises a stage glass 16 on which the transparency is placed, Fresnel lens 18 to properly focus the illumination from the projector's lamp, a motor 20 and a set of fan blades driven thereby to cool the projector, an operating switch 22, and a device 30 for detecting the failure of a main lamp 40 and automatically replacing the expired main lamp with a spare lamp 42 at the focus position.

The device 30 comprises, in combination, a frame 33 for supporting a lamp-changing mechanism 34 and a lamp failure detector 35 for sensing and reacting to the failure of the main lamp 40.

The lamp-changing mechanism 34, as shown in FIGS. 1 and 2, comprises a rotatable lamp support 36, an actuation means including a resilient spring 38 as biased in FIG. 1, and a first electrical means including electrical contacts 39 and 41 for electrically connecting the main lamp 40 and the spare lamp 42, respectively, to a 120-volt AC source via the switch 22. The rotatable support 36, which is pivotably mounted on pivots 43, comprises a base 44 to which the contacts 39 and 41 are mechanically secured, a rear vertical wall 46 and a front vertical wall 48 having an arm 50 operably connected to the spring 38 and a step 52 to operably engage the release means 60. The main lamp 40 and the spare lamp 42 of the projector, as shown in FIGS. 1 and 2, are detachably socketed to one or the other of the walls 46 and 48 or as illustrated to the rear wall 46 and the front wall 48, respectively, of the lamp support 36. The main lamp 40, as shown in FIGS. 1 and 2, is located in the focus position of the projector and upon rotation of the mechanism 34, under the bias of spring 38, the main lamp 40 will be moved out of the focus position and the mechanism 34 will rotate until positioned against a stop member (not shown) which will locate the spare lamp 42 in the focus position. Upon movement of the lamp-changing mechanism 34, contacts 39 will move away from the base contacts 45 secured to the frame 33 and contacts 40 will engage contacts 45 to electrically close the circuit to the spare lamp and thus provide illumination from the spare lamp 42.

The lamp failure detector 35, as pictorially shown in FIG. 3, comprises a single-pole switch 22 to provide electrical energy to the projector 10 from the 120-volt AC source, a time delay means 56, an energy-sensing means 58, and a release means 60.

The energy-sensing means 58 is located near the main lamp 40 to detect and react to the radiant energy from the filament of the lamp 40 and the absence of radiant energy from the filament of the lamp 40. The energy-sensing means illustrated includes a first bimetal bar 62 mechanically secured to the base which will open the contacts 63 in reaction to heat energy from the lamp 40. Thus, during normal operation of the projector 10 in which the main lamp 40 is illuminating the bar 62 will be bent to provide open contacts 63. Upon interruption of the heat from the lamp 40, the bar 62 will mechanically bend to close the contacts 63 and complete a portion of the electrical circuit through the release means 60. When the projector 10 is initially turned on and the contacts 63 are closed, however, the electrical circuit through the energy sensing means and the release means should be electrically open to prevent erroneous movement of the lamp-changing mechanism 34. The circuit may be maintained in an open condition by the use of a manual switch (not shown) or may be automatically opened and closed by a time delay means 56.

The time delay means 56 includes a second bimetal bar 64 to open and close the contacts 65 in response to heat energy provided by a second electrical means 61 including heater wires 66 encircling the bar 64. Upon closing of the switch 22 the heater wires 66 electrically connected in parallel with the lamp 40 will provide heat energy to the second bimetal bar 64. Thus heat will cause the bar 64 to mechanically bend and electrically close the contacts 65 within a predetermined time period after the switch 22 has been closed. Immediately after the switch 22 is closed the main lamp is illuminated which provides heat to the first bimetal bar 62 and the heater wires 66 provide heat to the second bimetal bar 64. The first bimetal bar 62 of the energy-sensing means 58 reacts more quickly, than bar 64, to open the contacts 63 before the contacts 65 are closed to prevent erroneous movement of the mechanism 34. If the main lamp 40 expired after the projector 10 had been turned off, as for example by the filament breaking, then upon closing of switch 22 the energy-sensing means 58 will not receive any heat and the contacts 63 will remain closed and upon the closing of contacts 65 the release means 60 will be energized to activate the movement of the mechanism 34. Also, if the main lamp expires during operation of the projector 10 the contacts 65 will have been closed and with the absence of heat the contacts 63 of the energy-sensing means 58 will close to energize the release means 60.

The release means 60 includes a third bimetal bar 68 to engage and release the step 52 in response to heat energy provided by a third electrical means 69 including heater wires 70 encircling the bar 68. When contacts 63, 65 are closed and electrical energy is provided through the heater wires 70, this energy will provide heat to mechanically bend the bar 68 to permit the biased mechanism 34 to move about pivots 43 under the bias of spring 38 and, thus, remove the main lamp 40 from the focus position, advance the spare lamp 42 into the focus position, and energize the spare lamp 42.

When the spare lamp 42 is being utilized, there is provided means as disclosed in the preferred embodiment as including an indicating lamp 72 to notify the operator that the spare lamp is in operation.

While the energy-sensing means 58 is illustrated as the above-mentioned bimetal bar responsive to the radiant energy from the main lamp filament, it could have the form of a photocell or other similar apparatus to sense light rays or other forms of electromagnetic energy from the main lamp 40 and thus activate the release means 60 in response to the absence of energy form the main lamp 40.

I claim:
1. A device having particular utility in a light projecting system for detecting the failure of a main lamp and automatically replacing the expired main lamp in the optical system with a spare lamp, said device comprising in combination:
   1. a frame;
   2. a lamp-changing mechanism having:
      a. a lamp support mounted on said frame for movement from a first set position to a second set position;
      b. a main lamp and a spare lamp mounted on said lamp support, to position said main lamp in a predetermined position when said support is in said first set position and to position said spare lamp in the predetermined position when said support is in said second set position;
      c. actuation means operably connected to said support for moving said lamp support between said first set position and said second set position;
      d. first electrical means on said support for electrically connecting the main lamp to a source of electrical energy in said first set position and for connecting said spare lamp to a said source upon movement of said support to said second set position;
   3. a lamp failure detector having:
      a. energy sensing means for detecting and reacting to the interruption of radiant energy from said main lamp;
      b. release means operatively responsive to the reaction of said energy-sensing means for activating said actuation means; and
      c. a time delay means operably connected to said energy sensing means for electrically connecting said energy sensing means to a source of electrical energy after a short period of time has elapsed from initial energization of said device.

2. The device according to claim 1 wherein said energy-sensing means includes a first bimetal means adjacent the main lamp for mechanically reacting to the interruption of energy through said main lamp to electrically connect said release means to the source of electrical energy.

3. The device according to claim 2 wherein said time delay means includes:
   1. a second electrical means operatively connected to a source of electrical energy for providing heat energy; and
   2. a second bimetal means adjacent said second electrical means for mechanically reacting to the heat energy in said second electrical means to electrically connect said energy-sensing means to a source of electrical energy after a short period of time has elapsed from initial energization of said device.

4. The device according to claim 3 wherein said release means includes:
   1. a third electrical means operatively connected to said energy-sensing means for providing heat energy; and
   2. a third bimetal means adjacent said third electrical means for mechanically reacting to the heat energy in said third electrical means to activate said actuation means.

5. The device according to claim 4 further including means responsive to the movement of said support for providing an indication to the operator that the spare lamp is in operation.